US008141693B2

(12) United States Patent
Sansevero et al.

(10) Patent No.: US 8,141,693 B2
(45) Date of Patent: Mar. 27, 2012

(54) COMBINED TRAFFIC FLOW AND MAINTENANCE INFORMATION DISPLAY FOR A PASSENGER CONVEYOR

(75) Inventors: Frank Sansevero, Glastonbury, CT (US); Carla Majuntke, Bristol, CT (US); Ralph Stripling, Berlin (DE); Scott Ashworth, Plainville, CT (US); Bernward Engelke, Hildesheim (DE); Qingdong Richard Jiang, Guangzhon (CN); Ruoming Roy Tian, Guangzhou (CN)

(73) Assignee: Otis Elevator Company, Farmington, CT (US)

( * ) Notice: Subject to any disclaimer, the term of this patent is extended or adjusted under 35 U.S.C. 154(b) by 1502 days.

(21) Appl. No.: 10/550,927

(22) PCT Filed: Apr. 4, 2003

(86) PCT No.: PCT/US03/10362

§ 371 (c)(1),
(2), (4) Date: Sep. 28, 2005

(87) PCT Pub. No.: WO2004/099039

PCT Pub. Date: Nov. 18, 2004

(65) Prior Publication Data

US 2006/0191771 A1 Aug. 31, 2006

(51) Int. Cl.
*B65G 15/00* (2006.01)

(52) U.S. Cl. ......... 198/324; 198/321; 198/322; 198/323

(58) Field of Classification Search ........... 198/321–338
See application file for complete search history.

(56) References Cited

U.S. PATENT DOCUMENTS

| | | | | |
|---|---|---|---|---|
| 3,565,238 | A | 2/1971 | Candela | |
| 4,711,335 | A * | 12/1987 | Watanabe | 198/324 |
| 4,798,274 | A * | 1/1989 | Saito | 198/324 |
| 5,178,254 | A | 1/1993 | Saito et al. | |
| 5,242,042 | A | 9/1993 | Mauldin | |
| 5,431,271 | A * | 7/1995 | Abraham et al. | 198/324 |
| 5,482,153 | A * | 1/1996 | Abraham et al. | 198/322 |
| 5,511,647 | A * | 4/1996 | Adrian et al. | 198/335 |
| 5,526,256 | A * | 6/1996 | Sakata et al. | 700/79 |
| 5,708,416 | A * | 1/1998 | Zaharia et al. | 340/531 |
| 5,782,330 | A | 7/1998 | Mehlert et al. | |
| 6,334,522 | B2 * | 1/2002 | Haruta et al. | 198/322 |
| 2003/0000798 | A1 * | 1/2003 | Williams et al. | 198/321 |

FOREIGN PATENT DOCUMENTS

| | | | |
|---|---|---|---|
| CN | 1173459 | A | 2/1998 |
| JP | 02123091 | A * | 5/1990 |

OTHER PUBLICATIONS

PCT International Search Report dated mailed Dec. 11, 2003 relating to International Application No. PCT/US03/10362.

* cited by examiner

*Primary Examiner* — Patrick Mackey
(74) *Attorney, Agent, or Firm* — Carlson, Gaskey & Olds PC

(57) ABSTRACT

A display device (40) for use with a passenger conveyor (20) provides a traffic flow direction indicator and visible maintenance information. One example includes a display panel (42) supported on a surface (38) that is conveniently positioned between a handrail (28) and a landing (24). In one example, a single display panel (42) alternatively provides the traffic flow direction indicator or the maintenance information. In another example a first display panel (42) and a second display panel (48) are supported on a plate (43) that is selectively moveable into different positions, depending on which display panel should be visible. One example includes a remote signaling device (62) that allows an individual to control the information shown on the display device (40).

8 Claims, 2 Drawing Sheets

20
22
24
26
28
30
32
34
36
38
40
51
60
62
64

COMBINED TRAFFIC FLOW AND MAINTENANCE INFORMATION DISPLAY FOR A PASSENGER CONVEYOR

FIELD OF THE INVENTION

This invention generally relates to displays for passenger conveyors. More particularly, this invention relates to a combined traffic flow and maintenance information display.

DESCRIPTION OF THE RELATED ART

Passenger conveyors, such as escalators and moving walkways, typically include a plurality of steps that move along a selected path between landings. In the case of escalators, the steps move in an upward or downward direction to carry passengers between different levels within a building, for example.

It has been desirable to provide a visible indication of the direction of movement of a passenger conveyor to approaching passengers. One approach has been to include visible markings on the outer decking beneath the balustrade associated with the handrail. This approach has been used where the balustrades are not clear. Another approach has been to include the visible marking on the outside of a glass balustrade. A shortcoming to either of these approaches is that they are visible only to passengers approaching the escalator from a straight-on direction. Such indicators may be visible at other particular angles but only from limited vantage points.

Another type of indicator provided previously was to include a post or sign external to the escalator indicating a direction of traffic flow. A shortcoming of such signs is that they are not part of the escalator system and can prove inconvenient to business owners, for example, who are trying to maximize their use of floor space.

Another type of indicator provided with escalators has been a fault indicator on an operation panel. Typically, the inner decking of the escalator has provided a location for mounting the operation panel. A mechanic or technician who desires to view information on such an operation panel must be on the escalator. As the vertical surface of the inner decking typically provided the location for the operation panel, the information on the panel was not readily visible without bending down to observe a displayed fault code, for example.

There is a need for an improved direction indicator display to provide individuals a visible indication of the direction of traffic flow of a passenger conveyor, such as an escalator. Additionally, there is a need for an improved operation panel display arrangement. This invention addresses both of those needs while avoiding the shortcomings and drawbacks of prior attempts.

SUMMARY OF THE INVENTION

In general terms, this invention is a display that provides traffic flow and maintenance information. One example device designed according to this invention includes a display that provides a visible indication of a direction of movement of the passenger conveyor and a visible indication of at least one type of maintenance information regarding the conveyor.

In one example, the display operates in a first mode to provide the direction indication and a second mode to provide the maintenance information.

In another example, a first display panel provides at least the direction indication while a second display panel provides at least some of the maintenance information. In one particular example, the display panels face in opposite directions and are mounted on a support plate that is moveable between a position where the first display panel is visible and another position where the second display panel is visible. One example includes at least one switch associated with the second display panel so that an individual can selectively page through the available information from the display.

Another example includes a remote signaling device that allows an individual, such as a mechanic, to select the contents of the display.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figures 1, 4:
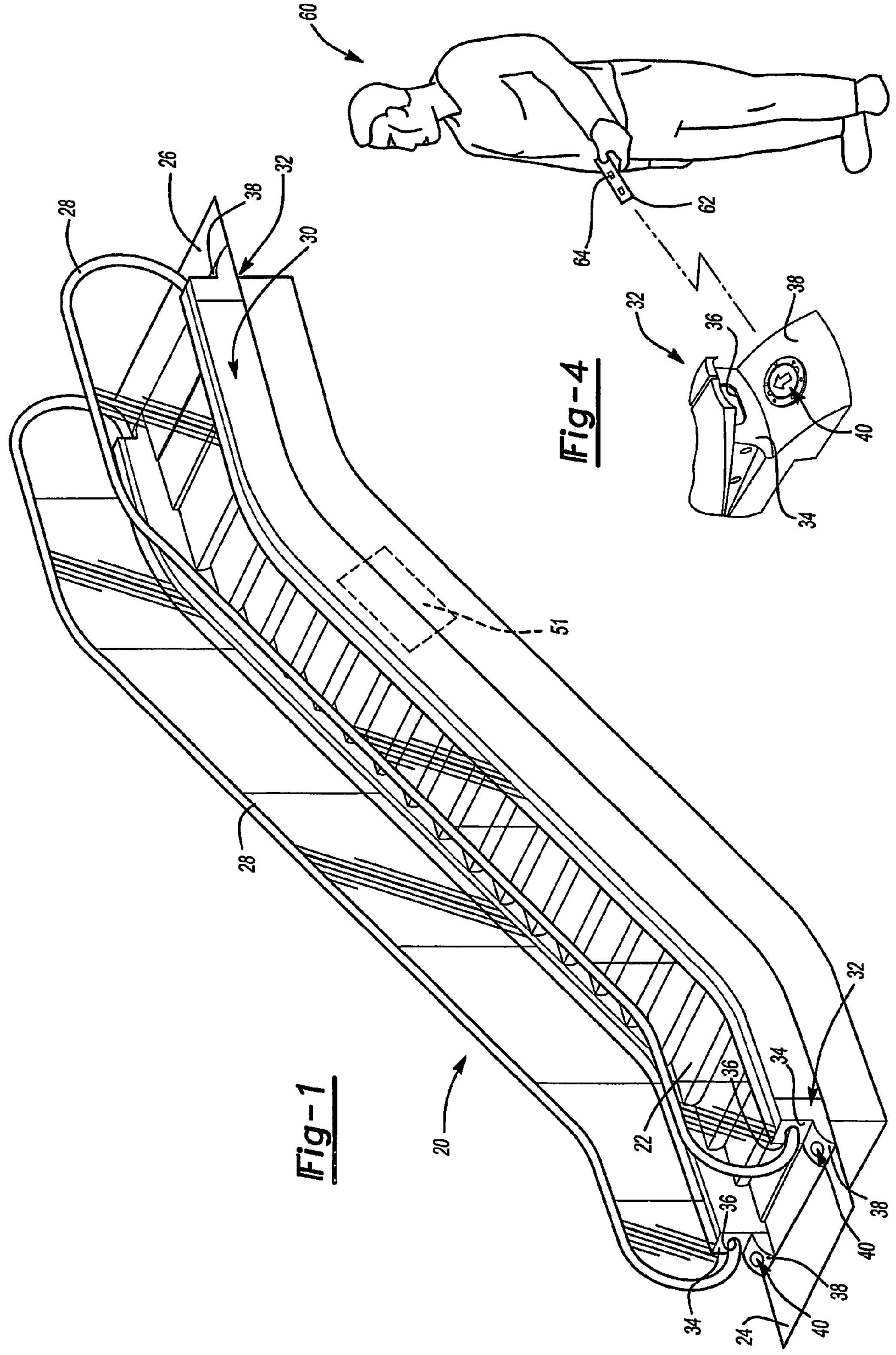
FIG. 1 schematically illustrates a passenger conveyor system incorporating a display designed according to an embodiment of this invention.
FIG. 4 illustrates another example embodiment of a display device designed according to this invention.

As shown in FIG. 1, a passenger conveyor 20 includes a plurality of steps 22 that move in a selected direction between landings 24 and 26. The illustrated conveyor is an escalator, however, this invention is not limited only to escalators. Moving walkways and other types of passenger conveyors are within the scope of this invention.

The steps 22 move in a conventional manner to carry passengers between the landings 24 and 26, which are at opposite ends of the escalator. A handrail 28 moves in a conventional fashion with the steps 22 to provide a handle to stabilize passengers on the escalator. A conventional escalator support structure 30 at least partially covers over some of the operating components of the escalator system in a conventional manner.

Handrail entry modules 32 are positioned on opposite sides of the steps at each landing. In this example, each module 32 includes a generally vertical surface 34 having an opening 36, which provides the handrail entry. A support surface 38 extends generally down and out from the vertical surface 34 between the corresponding landing and the vertical surface. In the illustrated example, the surface 38 is at least partially arranged at an oblique angle relative to the landing. In the particular examples of FIGS. 2 and 3, the surface 38 is rounded or at least partially curvilinear. The position angles and shapes of the surfaces 34 and 36 can be varied to meet the needs of a particular situation. Given this description, those skilled in the art will be able to select what provides them an intended result.

A display 40 is supported by the module 32 and in this example is generally aligned with the support surface 38. The display 40 provides a visible indication of the direction of traffic flow of the escalator. A variety of indicators may be provided on the display 40, depending on the selection of equipment to provide the display. One example indicator is an arrow pointing in the direction of traffic flow. Another example indicator is the word “UP” or the word “DOWN”

indicating a direction of escalator traffic flow. Other example indicators useful with a display designed according to this invention include a stop sign, a symbol indicating "no entry," a symbol indicating that an individual is entering a one-way street in the wrong direction or an "X" indicating that an escalator is not properly working and the steps are not moving. Those skilled in the art who have the benefit of this description will be able to select the appropriate display contents to meet the needs of their particular situation.

The display 40 also provides a visible indication of maintenance information regarding the escalator. Example maintenance information includes hours of operation, energy consumption, maintenance history and fault code indicators such as the fault codes used in the event that there is an interruption in operation of the escalator. Fault codes are known and typically indicate which safety switch has caused an escalator to shut down. A variety of such switches and corresponding codes are known. Those skilled in the art will be able to design appropriate indicators to convey the desired amount of maintenance information to meet their particular needs.

Figure 2:
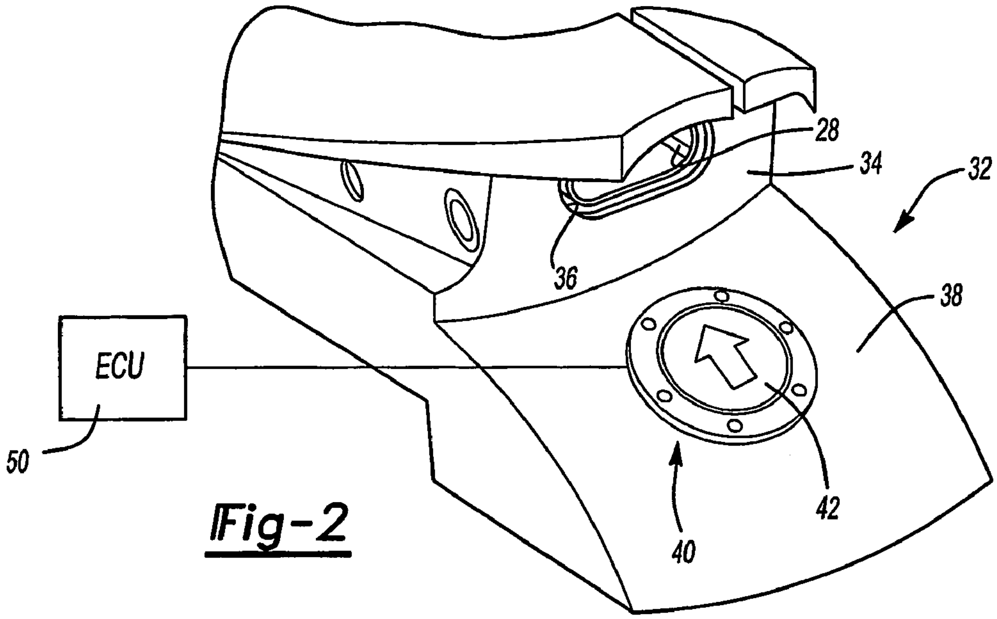
FIG. 2 diagrammatically illustrates an example display arrangement designed according to an embodiment of this invention.

Referring to FIG. 2, a display panel 42 provides the visible indication of the traffic flow direction or the maintenance information, depending on the needs of a particular situation. In one example, the traffic flow indication is provided during normal escalator operation. In the event that the escalator stops operating, for example, the display panel 42 displays maintenance information such as fault codes that can be interpreted by a mechanic or technician in a conventional manner. For example, fault codes indicate which switches have been actuated responsive to an undesirable operation condition of the escalator. Such fault codes enable the technician or mechanic to quickly diagnose the situation and take remedial action, as needed.

In one example, the display panel 42 includes lights that are selectively powered to provide the desired traffic flow indication. LED's are used in one example. Another example includes a liquid crystal display panel. A variety of commercially available displays can be incorporated into a device designed according to this invention and those skilled in the art who have the benefit of this description will be able to select appropriate components to meet the needs of their particular situation.

In one example, a single display panel 42 alternatively provides the traffic flow direction indication or the maintenance information.

Figure 3:
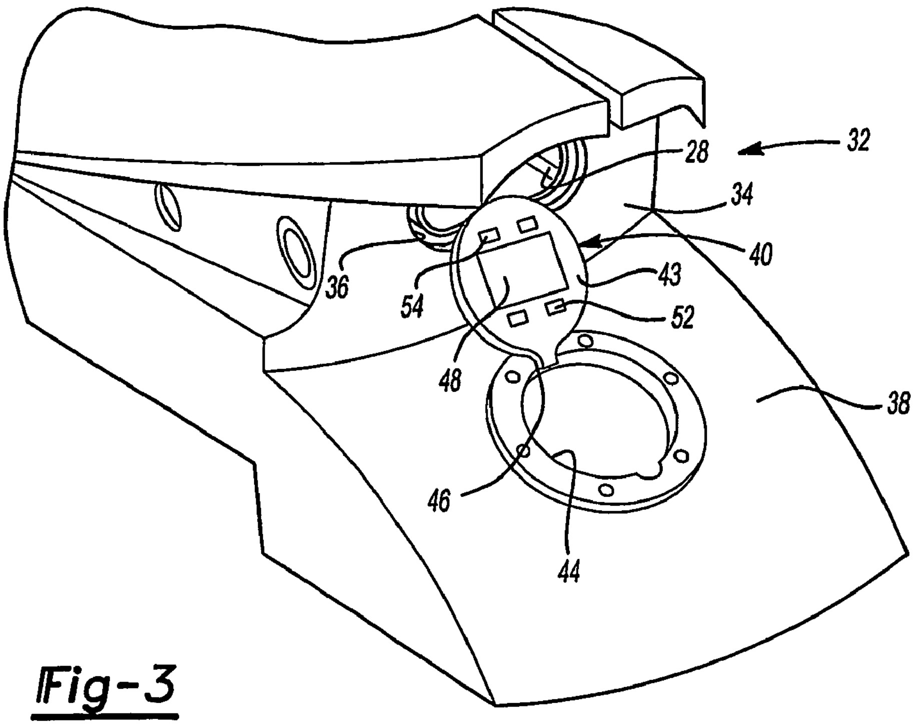
FIG. 3 illustrates another example arrangement designed according to this invention.

Another example is shown in FIG. 3 where the display panel 42 is supported on a plate 43 that is moveable relative to support surface 38. In this example, the surface 38 includes a recessed portion 44 that at least partially receives the plate 43 in a first position where the display panel 42 is visible (corresponding to the orientation shown in FIG. 2, for example). As shown in FIG. 3, the plate 43 is pivotally mounted at a hinge point 46 for movement into a second position shown in FIG. 3 where a second display panel 48 is visible. The second display panel 48 shows at least one indicator that provides the maintenance information as needed.

As schematically shown in FIG. 2, the display 40 is controlled by an electronic control unit 50. In one example, a dedicated microprocessor is provided to control the contents of the display 40. In another example, the controller 50 is part of a controller associated with the machine (i.e., motor and brake shown schematically at 51 in FIG. 1) that is responsible for controlling the movement or operation of the escalator. The controller 50 sends appropriate signals to the display 40 so that the desired display is provided. The controller 50, for example, provides an indication of the traffic flow direction based upon determined information regarding movement of the motor. In one example, the controller shows a direction indicator on the display whenever the steps are moving. In this example, a mechanic may selectively view the maintenance information by providing an appropriate override signal to the controller. In one example, whenever the escalator is stationary or being tested, the maintenance information is available.

Given this description, those skilled in the art will be able to program a commercially available microprocessor or computer to provide a desired display responsive to the operation condition of the escalator, which meets the needs of their particular situation.

In the example of FIG. 3, the plate 43 also supports a plurality of switches 52 and 54 or includes a touch screen to allow a mechanic or technician to manually page through various displays of information available on the display panel 48. For example, the switch 52 may be used to scroll or page through various fault code indications.

Another example arrangement is shown in FIG. 4 where a mechanic or technician 60 has a signaling device 62 that can be carried about by the technician. At least one switch 64 is supported on the signaling device 62 so that the mechanic can obtain a desired display on the display 40 to page through fault code indications, for example. In one example, the signaling device 62 allows a technician or mechanic to set the traffic flow indicator to correspond to the direction of movement of the conveyor or to choose the style of indicator for a particular installation. Conventional radio frequency transmissions can be used for communicating between the transmitter 62 and the appropriate electronics controlling the display 40 such as the controller 50.

One advantage of the illustrated example embodiment of this invention is that it places the display 40 near the handrail entry point 36. Providing a display of traffic flow information between the handrail and the landing makes the indicator more readily visible from a variety of angles and more readily interpreted as providing a direct indication of the direction of flow or movement of the steps 22. This invention allows for integrating a traffic flow and maintenance information display into a passenger conveyor system in a manner that is aesthetically pleasing and provides higher functionality than previous attempts.

The location of the display 40 is not necessarily limited to a position between the handrail and the landing, however. Those skilled in the art who have the benefit of this description will be able to strategically locate a combined display designed according to this invention in a location that suits their particular needs.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A device for use with a passenger conveyor, comprising:

a display that provides a visible indication of a direction of movement of the conveyor and a variable, visible indication of maintenance information regarding the conveyor, wherein the display includes a first display panel that provides at least the direction indication and a second display panel that provides at least some of the maintenance information; and a support and wherein the display panels are supported for movement relative to the support between a first position where the first panel is visible and a second position where the second panel is visible.

2. The device of claim 1, wherein the display panels are on opposite sides of a plate portion and the plate portion is pivotally moveable relative to the support.

3. The device of claim 2, including a recess on the support and wherein the plate portion is at least partially received in the recess in the first position.

4. The device of claim 3, wherein the support is adapted to be placed between a handrail and a landing near an end of the conveyor and the recess is on a surface of the support that is at least partially at an oblique angle relative to the landing.

5. A device for use with a passenger conveyor, comprising:

a display that provides a visible indication of a direction of movement of the conveyor and a variable, visible indication of maintenance information regarding the conveyor wherein the display includes a first display panel that provides at least the direction indication and a second display panel that provides at least some of the maintenance information; and at least one switch supported near the second display panel, the switch being actuatable to selectively view available maintenance information.

6. A passenger conveyor, comprising:

a plurality of steps that are moveable along a selected path between two landings;

a machine that selectively moves the steps; and a display near one end of the conveyor that provides a visible indication of a direction of movement of the conveyor and a variable, visible indication of maintenance information regarding the conveyor, wherein the display includes a first display panel that provides at least the direction indication and a second display panel that provides at least some of the maintenance information;

a support; and a plate portion that is moveably supported by the support and wherein the display panels are on opposite sides of the plate portion.

7. The passenger conveyor of claim 6, including a recess on the support and wherein the plate portion is at least partially received in the recess when the first panel is visible.

8. The passenger conveyor of claim 7, wherein the recess is on a surface of the support that is at least partially at an oblique angle relative to one of the landings.

* * * * *